(12) United States Patent
Chong et al.

(10) Patent No.: US 11,818,514 B2
(45) Date of Patent: Nov. 14, 2023

(54) INTEGRATED DCI COMPLIANT MOVIE PLAYER AND DLP PROJECTION EQUIPMENT

(71) Applicant: GDC Technology (Shenzhen) Limited, Shenzhen (CN)

(72) Inventors: Man Nang Chong, North Point (HK); Pranay Kumar, North Point (HK)

(73) Assignee: GDC Technology (Shenzhen) Limited, Shenzhen (CN)

( * ) Notice: Subject to any disclaimer, the term of this patent is extended or adjusted under 35 U.S.C. 154(b) by 0 days.

(21) Appl. No.: 17/521,801

(22) Filed: Nov. 8, 2021

(65) Prior Publication Data

US 2023/0142037 A1    May 11, 2023

(51) Int. Cl.
*H04N 9/31* (2006.01)
(52) U.S. Cl.
CPC ......... *H04N 9/3179* (2013.01); *H04N 9/3102* (2013.01)
(58) Field of Classification Search
CPC .... G03B 21/008; G03B 21/28; G03B 21/145; G03B 21/208; G03B 21/2053; G03B 21/2066; H04N 9/3102; H04N 9/3105; H04N 9/3108; H04N 9/3179; H04N 9/3182; H04N 9/3188
See application file for complete search history.

(56) References Cited

U.S. PATENT DOCUMENTS

| | | | | |
|---|---|---|---|---|
| 2011/0134344 A1* | 6/2011 | Marcus | ................ | H04N 9/3182 348/752 |
| 2014/0028698 A1* | 1/2014 | Maier | ...................... | G09G 5/02 345/589 |
| 2016/0007350 A1* | 1/2016 | Xiong | ................... | H04W 24/10 370/252 |
| 2016/0116834 A1* | 4/2016 | Candry | .................. | G02B 30/27 359/449 |
| 2018/0322679 A1* | 11/2018 | Kunkel | .................... | G06T 11/60 |
| 2020/0213567 A1* | 7/2020 | Okada | .................. | H04N 9/3188 |
| 2022/0224974 A1* | 7/2022 | Claypool | ............. | H04L 63/0457 |

* cited by examiner

*Primary Examiner* — Sultan Chowdhury
(74) *Attorney, Agent, or Firm* — Morrison & Foerster LLP (57) ABSTRACT

The present disclosure relates to a digital light processing (DLP) projection equipment and its electronic device. There proposes an electronic device for a digital cinema grade DLP projection equipment compatible with Digital Cinema Initiatives (DCI), including: a processing circuit configured to process an input video data; an output controller to control processed video signal so that the video signals are suitable for projection display via an output optics, wherein the processing circuit and the output controller are integrated on the same circuit board.

17 Claims, 3 Drawing Sheets

INTEGRATED DCI COMPLIANT MOVIE PLAYER AND DLP PROJECTION EQUIPMENT

TECHNICAL FIELD

The present disclosure relates to the digital light processing (DLP) technology, and in particular to digital cinema-grade movie playback and DLP projection equipment.

BACKGROUND

The movies have been around for more than 100 years and are popular with the public. With the rapid development of science and technology, especially digitalization technology, the digital projection technology has gradually been widely employed in the film industry.

Digital Light Processing (abbreviated as DLP) is a technology that processes image signals digitally and then projects the processed signals via light. DLP technology in particular can be applied in digital cinemas for digital image display. DLP projectors applied in the context of digital cinemas must comply with the Digital Cinema Initiatives (DCI) standards.

Conventional digital cinema-grade DCI compliant DLP projectors often use several different electronic components which work together to process the input data so that original images could be displayed on the screen. Such several different electronic components, for example various components for digital processing of image signals, are arranged on different circuit boards. In addition, a playback circuit, which is applied to securely convert input data files into audio and video, is a circuit basically independent from the projector, and is usually located outside the projector or inside the main body of the projector. These separate components are connected to each other through communication lines and interfaces to transmit data and related information. However, such separate arrangement may result in certain problems in multiple aspects such as cost, reliability, security, and so on.

Therefore, there is a need for design of an improved digital cinema grade DCI compliant DLP projector.

SUMMARY

The present disclosure provides an all-in-one technical solution especially suitable for digital cinema-grade DLP projector, in which at least playback and projection processing as the core in a digital cinema-grade DCI compliant DLP projector is implemented on the same circuit board, and low cost and high reliability can be achieved on the premise that security requirements can be met.

According to an aspect of the present disclosure, an electronic device for a digital cinema-grade DCI compliant DLP projection equipment is provided, comprising: a processing circuit configured to process input video data; an output controller to control processed video data so that the video signals are suitable for projection display via an output optics, wherein the processing circuit and the output controller are integrated on the same circuit board.

According to an aspect of the present disclosure, there provides a digital cinema-grade DCI compliant DLP projection equipment, comprising the above-mentioned electronic device, and at least one output optics, which implements projection display of the video signal from the said electronic device.

According to an aspect of the present disclosure, there provides a digital cinema-grade theater system, including the above-mentioned DLP projection equipment and other necessary devices for movie playback.

Other features of the present invention will be clear from the following description of exemplary embodiments with reference to the drawings.

DRAWINGS

The accompanying drawings, which are incorporated in and constitute a part of the specification, illustrate embodiments of the present disclosure and are used in conjunction with the description to explain the principles of the present disclosure. In the drawings, similar reference numerals refer to similar items.

Although the embodiments described in the present disclosure may be susceptible to various modifications and alternative forms, specific embodiments thereof are illustrated as examples in the drawings and described in detail herein. However, it should be understood that the drawings and detailed description thereof are not intended to limit the embodiments to the particular forms disclosed, but on the contrary, the purpose is to cover all modifications, equivalents, and alternatives falling within the spirit and scope of the claims.

DETAILED DESCRIPTION

Exemplary and representative implementations of embodiments of the present disclosure are provided in this section. These examples are provided only to add context and to aid in understanding the described implementations. It will therefore be apparent to those skilled in the art that the embodiments described in this disclosure may be implemented without some or all of these specific details. In other instances, well-known process steps have not been described in detail in order to avoid unnecessarily obscuring the implementations described herein. Other applications are also possible, so that the following examples should not be considered as limiting.

Hereinafter, embodiments of the present invention will be described in detail with reference to the accompanying drawings. It should be noted that similar reference numerals and letters in the drawings refer to similar items, and therefore once an item is defined in one figure, it is not necessary to discuss in the subsequent figures. Here, it should also be noted that to avoid obscuring the present disclosure due to unnecessary details, the drawings only show the processing steps and/or device structures closely related to at least the solution according to the present disclosure, and the other details not that related to this present disclosure are omitted.

In this present disclosure, the terms "first", "second", and the like are used only to distinguish elements or steps, and are not intended to indicate chronological order, preference, or importance.

DLP is a leading technology in digital cinema (DCinema) projection. In addition to scenarios for home use, DLP projectors are especially suitable for digital cinema scenarios, such as the DLP Cinema® projector developed by Texas Instruments (TI). It should be pointed out that different from conventional home-grade DLP, digital cinema-grade DLP projectors require meeting higher performance requirements. In particular, the Digital Cinema Initiatives (DCI) standard must be met, whereas the commonly used home-grade DLP is not suitable for usage in the digital cinema environment.

The DCI standard is an industry standard, and all digital cinema-grade digital movie playback equipment and projection equipment need to be designed in compliance with this standard to meet the projection requirements of digital movies. The DCI standard may include a range of requirements, especially security requirements, for example, the security of media assets, and accuracy requirements, such as the accuracy of data processing algorithms, and the like. DCI also defines the requirements for minimum presentation quality, including for example, resolution and frame rate. To conform to the stringent requirements of DCI, most video processing and security modules must be tailored to DCI. In the conventional digital cinema-grade projector design which meets DCI standard/requirements, it is often necessary to use a few individual signal processing boards to perform corresponding signal processing on the input data, so as to meet the DCI standard/requirements respectively. In particular, a DLP projector requires a media player (internal or external) that can convert encrypted and compressed data files into video (and audio) data which can be processed by the projector to create visual effects on the screen. But given the existing technology, the media player is independent from the DLP projector, and is often disposed on a circuit board different from the DLP projector.

Figure 1:
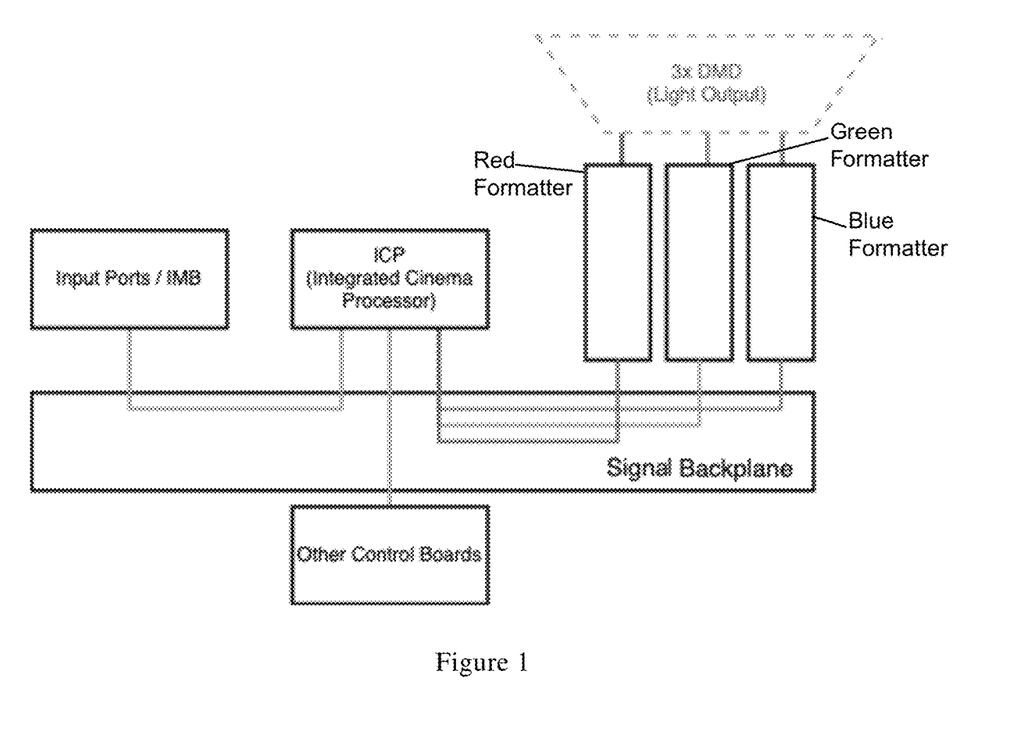
FIG. 1 is a block diagram of a conventional DCI compliant DLP playback device in the prior art.

FIG. 1 illustrates a schematic configuration of a digital cinema-grade DLP projector which meets DCI standard/requirements in the prior art. The DLP projector is a conventional 3-chip DLP projector, which has an IMB, an integrated cinema processor (ICP), and a red formatter, a green formatter, and a blue formatter respectively corresponding to each of a three-colored Digital Micromirror Device (DMD). These components are located on their own chips respectively, and transmit signals to each other through a signal backplate. In addition, the DLP projector may also include other control boards, which are used to control power and manage a light source in the DLP projector, and the like. It should be pointed out that the DLP projector may also have other components, such as a power management component, the light source (for example, laser diode, xenon lamp, or any other suitable light source), optics, and the like. For clarity, these components are not shown herein.

The input of the DLP projector is in the form of DCP (Digital Cinema Package), which can be input to the DLP projector via various standard interfaces (such as USB and eSATA). The IMB can function as the aforementioned player, decrypting and decompressing the input content, and ultimately converting all these input files into raw video and audio. For sure, the IMB must also have many other known functions, which will not be elaborated on herein.

Then, the converted video is transmitted to the ICP through the backplane.

The ICP processes the received video data. In particular, the ICP performs scaling, image cropping, color processing, and the like on the video, so as to make the processed video data suitable for the downstream sector. Especially, ICP divides the video signal into red, blue, and green components for subsequent formatters to process. It should be pointed out that the ICP can also perform other known processing related to the video data, which will not be described in detail herein.

Subsequently, the processed video data is transmitted to the formatters (red formatter, green formatter, and blue formatter) through the backplane, and the data of each color component is transmitted to the formatter of the corresponding color through the corresponding line.

The formatter further processes the signal to make it suitable for DMD to complete visual display of digital information. Specifically, the formatter processes the signal, enabling the DMD to understand the visual information carried by the signal, such as the information about each color, so that correct color/amount of light can be directed to the screen. The signal type, signal form, signal sequence, and the like output by the formatter depends on the DMD device used. For example, if it needs to display 3D video, the formatter can also apply any 3D multiplication to provide 3D data.

However, the conventional digital cinema-grade DLP projector which meet DCI standard/requirements suffers from the following issues.

1) Cost: Using separate circuit boards to accommodate so many high performance and long lifetime components inevitably increases the cost/price of the digital cinema projector, whilst customers are usually very sensitive to cost/price, and there has been a constant hunt for solutions that can bring the cost of DLP cinema projector down.

2) Reliability: It is well known that the components in the system, such as electronic components, mechanical components, the like, and the connections between components often suffer from a certain degree of failure rate (acceptable and known failure rate). The more the number of components in the system, and the more the number of separate circuit boards carrying the components, the lower the overall reliability of the system. Particularly, given the existing technology, the IMB is often arranged on a separate circuit board separately from the projector. During work process, the IMB needs to decrypt the video in a secure manner. However, this separate arrangement makes it difficult for the IMB to be designed to meet safety requirements. Even if the IMB design on the separate circuit boards meet the DCI requirements, there may still be security and reliability risks due to the signal transmission between the separate components across the circuit board.

3) Performance limitations: Interface connectors are required to connect the separate circuit boards in the system, and the signal must be transmitted over a longer distance. The speed of processing will be limited and the signal will be interfered during transmission. Moreover, the specifications, level requirements and the like for the interface connectors of different circuits may be different, therefore, the signal may need to undergo various intermediate conversion processes, such as format conversion, code conversion, and the like, to be adapted to requirements of different interface connectors and various circuit components, which affects the accuracy of data processing and further deteriorate the performance.

4) Size: It is quite obvious that there is a limitation of how small a single electronics board can be made, especially those that needs to be interconnected by humans. Having a larger number of separate circuit boards in a system would inevitably enhance the size of equipment.

Therefore, it is necessary to propose an improved digital cinema-grade DLP projection equipment which meets DCI standard/requirements, for example an improved DLP Cinema® projection equipment, so as to meet DCI requirements, reduce costs and optimize performance. It should be pointed out that, throughout the specification of the present disclosure, a DLP projection equipment which meets DCI standard/requirements may also be referred to as a DLP projection equipment compatible with DCI standard, or simply a DCI compliant DLP projection equipment. Furthermore, for the sake of simplicity, a DLP projection equipment referred to hereinafter refers to DCI compliant DLP projection equipment, unless otherwise stated.

In view of the above, the present disclosure proposes an all-in-one technical idea, wherein the functions implemented by multiple separate circuit boards in a conventional DCI compliant DLP projection equipment can be implemented in a single circuit board; especially, the media player and the DLP projector can be implemented on a single circuit board in an all-in-one manner. Compared to the conventional DCI compliant DLP projection equipment, the aforesaid various defects could be mitigated or even eliminated, while the stringent quality and security requirements could be met, with even better quality and greater security can be obtained. The circuit board may be any board suitable for carrying electronic components to perform data processing, such as a PCB board, a silicon substrate, and the like.

Specifically, according to an embodiment of the present disclosure, the processing from the input of video data to the output of display data is implemented on a single circuit board in an all-in-one manner, in particular, the input data can be directly output to the DMD device for projection display by means of the processing on such a single circuit board, without transmission and data conversion between the components carried on multiple separate circuit boards. In this way, the number of circuit boards decreases, and the cost and size are reduced effectively. Besides, the distance of transmission is shortened, getting less affected by interference, which can effectively alleviate performance limitations and improve security. In addition, the intermediate data conversion can be reduced, contributing to improve accuracy and reliability.

Figure 2:
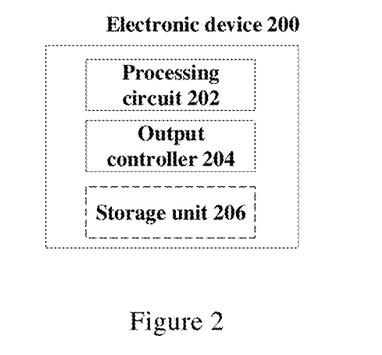
FIG. 2 is a block diagram of an electronic device for a digital cinema-grade DCI compliant DLP projection equipment according to the present disclosure.

FIG. 2 illustrates a block diagram of an electronic device for a digital cinema-grade DCI compliant DLP projection equipment according to this present disclosure. It should be pointed out that the digital cinema-grade DCI compliant DLP projection equipment according to the present disclosure is particularly suitable for digital cinema application, but it can also be used by individual users, for example, in a home environment to acquire the viewing effect with higher quality.

The electronic device 200 includes a processing circuit 202 and an output controller 204, the processing circuit 202 being configured to process input video data, and the output controller 204 being configured to control processed video signal to be suitable for projection display via an output optic, where the processing circuit 202 and output controller 204 are integrated on the same circuit board.

According to the embodiments of the present disclosure, the processing circuit and the output controller are implemented on a single circuit board in an all-in-one manner, in particular, optimized circuit design and data processing can be implemented for input data files and based on the final optical output requirements, to fulfill the performance requirements by means of a compact structure.

According to the embodiment, the electronic device operates so that the digital cinema-grade DLP projection equipment according to the present disclosure can meet the DCI security requirements in the digital cinema application and is DCI compatible. That is, the all-in-one design and processing targeting specific requirements for DLP in digital cinema applications can effectively achieve circuit simplification and cost reduction while meeting the requirements.

In particular, for the input video file/data, the processing circuit performs various appropriate processes (for example, including all appropriate data conversion) to form video signals for meeting the DCI quality and security requirements, and the format of the result video signals directly matches the input requirements of the output controller, so the video signals can be directly transmitted to the output controller in the same circuit board for further processing, so that the combination of the processing circuit and the output controller can also meet the DCI requirements. Finally, the output controller can process the signals to enable the DMD device to understand the visual information carried, so that the appropriate color/amount of light can be directed to the screen.

It should be pointed out that the all-in-one design of the processing circuit and the output controller and their respective configurations can be implemented in a variety of ways, as long as they can meet the specific requirements in the DCI compliant DLP applications, in particular including security and quality requirements. The example will be elaborated on later.

In particular, according to an embodiment of the present disclosure, the processing circuit is further configured to directly match and output the processed video signal to the output controller without any intermediate conversion. Accordingly, the input video data received by the electronic device can be processed according to the processing requirements of the subsequent output controller, so the processed signals directly meet the requirements of the output controller. In this way, from the input data file, the signal adapted to the subsequent output controller could be directly obtained, reducing various intermediate conversions in the conventional technology, for example, the intermediate conversions from IMB to ICP in the conventional DCI compliant DLP projection equipment. In this way, on the condition that the quality requirements are met, reliability, accuracy, and the like can be improved.

According to the embodiment, the processing circuit is one that complies with the Digital Cinema Initiatives (DCI) specifications, making the processed signal data to meet the DCI requirements, especially security and quality requirements, achieving DCI compatibility.

According to an embodiment, the processing circuit is a DCI compliant processing circuit, which is configured to process the input video data to comply with DCI security requirements. It should be noted that in terms of security, the DCI requirements for a movie player are very high, requiring the system to comply with DCI compatibility and FIPS 140-2 security requirements. Preferably, the DCI security requirements include FIPS 140-2 certified physical security and/or logical security.

In particular, as an example, the security boundary in the circuit design must pass the FIPS 140-2 safety requirements, which requires that the circuit components be under the following security boundary: even if the system is powered off so that the secret identification of the circuit board is extracted, the security boundary still cannot be tampered/destroyed. By virtue of the all-in-one design and the functional configuration of the processing circuit, the transmission of signals between separate circuit boards is reduced, which in turn reduces the risk of exposure and enables signal processing to meet security requirements.

Additionally or alternatively, the DCI processing circuit is further configured to process the video data/video signal so that the processed video signal can meet DCI quality requirements. In particular, the DCI processing circuit can properly process the input video file so that the processing results comply with the frame rate, resolution, and the like in the DCI requirements, and the processed video signal can also directly match the processing requirements of the subsequent output controller, thereby reducing any possible intermediate conversion, which further avoids any adverse effect on the data quality caused by any intermediate conversion.

According to the embodiment, the DCI processing circuit is further configured to process the input video data for playback on per the projection equipment and/or a time window basis.

According to an embodiment of the present disclosure, the output controller is further configured to condition the video signal to be directly adapted to the requirements of the output optics. The operation of the output controller depends directly on the condition of the output optics, for example, the type, requirements, and the like of the output optics. For example, as described above, the output controller may correspond to conventional formatters so as to perform three-color segmentation for the input signal, or the output controller may also perform 3D processing to achieve 3D rendering. It should be pointed out that the output controller can also perform other types of processing, which will not be described in detail herein.

It should be pointed out that when electronic components are carried on physically different boards to implement digital cinema-grade DCI compliant DLP projection processing, the intermediate signal transmission needs to consider the signal requirements of each board, such as level, clock, and the like; and those different requirements require various conversions to be performed during data transmission between the boards via interface, affecting the signal accuracy and resolution, and causing data loss or even errors. On the contrary, in the present embodiment, through the optimized design on a single circuit board, especially the data processing algorithm design, the input video file can be directly converted into signals suitable for display by an output optics (such as a DMD device), removing the intermediate circuit board and the intermediate conversion, relaxing or even eliminating the requirements on these characteristics/parameters. In particular, through improved design and processing on a single circuit board, hardware (for example, the number and arrangement of interfaces, since for data connection/transmission, connectors/cables and other interfaces are typical failure points) and multi-level data conversion can be reduced, achieving cost reduction and high reliability on the condition that the performance requirements are met.

It should be pointed out that, in this embodiment, with respect to the requirements on the input video file and the signal of the output optics, on the condition that the digital cinema grade DCI requirements are complied with, an improved all-in-one design can be implemented on a single circuit board, which is not a simple integration of functions; instead, the circuit layout, signal transmission and other aspects are improved and optimized.

For example, the wiring on the circuit boards are optimized so that the direct connection between the various components on the same circuit board is implemented, which can reduce and even eliminate the interface connection between different circuit boards, and the like in the conventional design. In addition, the components are arranged on the same circuit board, so that the signal requirements of respective components could match each other, such as having the same resolution, the same or similar level, clock, and the like, thereby reducing intermediate data conversion.

It should be understood that FIG. 2 is only a schematic structural configuration of an electronic device used for a digital cinema-grade DCI compliant DLP projection equipment, and the electronic device 200 may also include other possible components. As an embodiment, the electronic device 200 may also include a storage unit 206, for storing various information generated by the electronic device and other information required for processing operations. The storage unit may be volatile and/or non-volatile. For example, the storage unit may include but not limited to, random access memory (RAM), dynamic random access memory (DRAM), static random access memory (SRAM), read only memory (ROM), and flash memory. Optionally, the electronic device 200 may also include other components not illustrated, such as a network interface, a controller, and the like. Without doubt, these components are not necessarily included in the electronic device according to the present disclosure.

Figure 3:
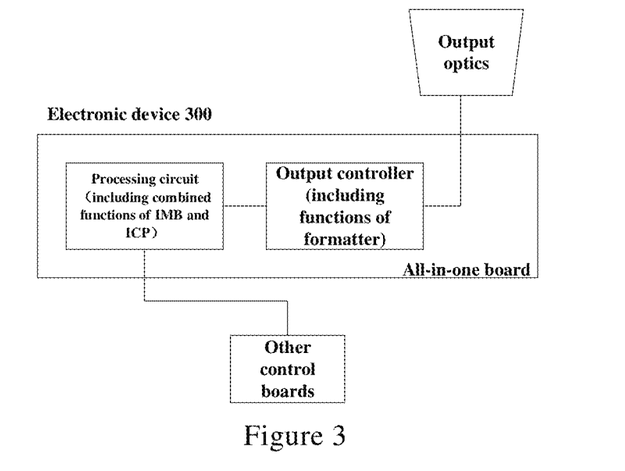
FIG. 3 is a schematic diagram of an exemplary electronic device for a digital cinema-grade DCI compliant DLP projection equipment according to the present disclosure.

Hereinafter, the exemplary electronic device for a digital cinema-grade DCI compliant DLP projection equipment according to the embodiment of the present disclosure will be described, with reference to FIG. 3. On the all-in-one board of the electronic device 300, the illustrated module including designs of both IMB and ICP may correspond to the processing circuit of the present disclosure, and the formatter logic may correspond to the output controller of the present disclosure.

It should be pointed out that the processing circuit of the present disclosure can effectively realize the functions of both IMB and ICP in the conventional digital cinema-grade DCI compliant DLP projector. For example, the processing circuit of the present disclosure may include at least a player function, so that the present disclosure can realize that the player and the DLP projector are integrated on a single circuit board. It should be noted that the processing circuit is not a simple combination of such two, but is designed directly based on the input data file in consideration of the processing requirements of the formatter logic (for example, the requirements for the input data to be processed), so that, signals adapted to the formatter logic can be obtained directly from the input data file, improving the design of different components compared to that on different circuit boards in the conventional technology.

Similarly, the output controller of the present disclosure can effectively implement the function of the formatter logic in the conventional digital cinema-grade DCI compliant DLP projector, but not a simple replacement of the formatter logic. Instead, in consideration of matching with the output of the foregoing processing circuit and generating outputs easy to be operated by the optical output device (for example, DMD), the circuit design is optimized on a single circuit board, to implement the corresponding functions.

In addition, the digital cinema-grade DCI compliant DLP projector may also include other control boards, which are used to control the power, manage the light source, and the like in the DLP projector. It should be pointed out that the DLP projector may also have other components, such as power management components, light sources (for example, laser diodes, xenon lamps, or any other suitable light sources), optics, and the like. For clarity, these components are not illustrated herein. It should be pointed out that the electronic device according to the present disclosure may not include these components.

The input of the digital cinema-grade DCI compliant DLP projector is in the form of Digital Cinema Package (DCP), which can be input to the DLP projector via various standard interfaces (such as USB and eSATA).

In operation, an input video file is input to the processing circuit, and such processing circuit implements the joint functions of IMB and ICP in an all-in-one manner, and directly generates outputs adapted to the subsequent formatter logic. In particular, the output of the processing circuit is adapted to be directly processed by the subsequent formatter logic, such as direct matching in terms of format, level, clock, and the like. For example, the input content can be decrypted and decompressed, and the video data can be processed in various ways, such as video scaling, image cropping, color processing, and the like, so the processed video data is adapted to the subsequent formatter logic. It should be pointed out that the processing circuit can also implement many other known functions, such as other functions that can be implemented by IMB and ICP, and can also perform other processing operations to meet the requirements. For example, the processing circuit also implements DCI's own DRM, in which the content is decrypted and controlled so that it can be playbacked on the basis of each device and time window.

Thereafter, the processed video data is directly transmitted to the formatter logic through lines on the same circuit board; and in the logic formatter, the video signal is further processed to generate various color signals adapted to DMD for visual display of digital information. Specifically, the formatter processes the signal so that the DMD can understand the visual information carried by the signal, such as the information about each color, so that correct color/amount of light can be directed to the screen. The signal type, signal form, signal sequence, and the like, output by the formatter depend on the DMD device used, which will not be elaborated on herein.

Accordingly, through the optimized design of the all-in-one board for the electronic device according to the present disclosure, the input signal is operated and processed so that an image can be projected through direct control of the DMD by the all-in-one board. For example, the full RGB image as input can be directly projected by the DMD via the all-in-one board. Moreover, according to the present disclosure, the number of DMD devices for projecting RGB is not particularly limited, and the three primary color signals can be properly processed depending on the number of DMD devices.

For example, in a case where three DMD devices are used, each of which processes signals of one color among the three primary colors (red, blue, and green), the logic formatter can directly output a trichromatic signal to the DMD device for the corresponding color.

For example, in a case where two DMD devices are used, the logic formatter can further process the signals of the three primary colors, and send the combination of two color signals to one DMD device, and the remaining one color signal to another DMD device.

For example, in a case where a single DMD device is used, any algorithm can be used to process the signals of the three primary colors so that the desired DCI color performance can be implemented by a single DMD device. The same can be applied in the case of more than three DMD devices.

In the present disclosure, the functions of both IMB and ICP are implemented by means of a processing circuit in an all-in-one configuration. In particular, the IMB usually is not a part of the projector, and thus, to some extent, the all-in-one board according to the present disclosure not only provides the function of a conventional projector, but also incorporates an IMB.

In a conventional digital cinema-grade DCI compliant DLP projection design, there are at least three independent functional boards, IMB, ICP, and formatter in order. These three independent functional boards are inter-connected through the backplane and then connected to the projection optics. Usually, these boards are designed by independent providers, and their designs are not disclosed. In this way, when such boards are applied to DLP projection, there is the need for complex interface connections and intermediate signal conversions to implement transmission of signals between these independent boards. The present disclosure focuses on the input data file and the output for the projection optics, and based on the output requirements and other requirements, such as DCI requirements, and the like, the function between input and output is implemented on a single circuit board with improved design, so that the functions of the three circuit boards of IMB, ICP and formatter can be realized on a single circuit board, dramatically simplifying the design of the projector. In addition, through the all-in-one single-circuit design, some interface components and connection lines in the conventional design can be omitted, reducing costs, and lowering the risks of data interference or even data tampering when the data is communicated between separate circuit boards through interfaces and lines.

Moreover, in the conventional design, the video data needs to be successively adapted to corresponding circuit devices throughout transmission. The input video is input to IMB in a manner that it can be received and processed by the IMB, and the IMB processes the input video and passes it to ICP. In order that the ICP can receive and process data, the IMB applies circuits and/or performs calculations to convert the input data into a format suitable for the ICP. The ICP will receive such format and then convert it again into internal data for processing. The same applies to the connection from the ICP to the formatter. In this way, a number of intermediate conversions occur during operation, introducing significant data processing errors, and resulting in impaired data accuracy or even data errors. The present disclosure proposes an improved design on a single circuit, so that the data complying with processing requirements of the formatter and even display requirements of the output optics can be directly obtained from the input data, thereby reducing or even eliminating some unnecessary intermediate conversions, avoiding data loss caused by the intermediate conversions, and improving the quality and reliability of the output. In particular, the algorithm according to the present disclosure is optimized to prevent multiple conversions. For example, after decoding, the image will not be converted to an intermediate format that can be understood by ICP, and then converted to another format that can be understood by the formatter logic. Instead, the processing circuit outputs the image directly to the formatter logic, omitting the intermediate conversions. That is, through the improved algorithm, the input signal adapted to the formatter logic, such as in terms of format, resolution, clock, and the like, can be directly obtained from the input data.

In addition, in the all-in-one single-circuit design of the digital cinema-grade DCI compliant DLP projector according to the present disclosure, internal algorithms are designed and optimized so they all run in one processing core. Image processing algorithms usually use similar algorithms, such as filters that are matrix calculations. If a series of algorithms are applied to data on the same circuit (rather than different modular boards), they can be "merged" into a combined algorithm (taking a matrix as an example, which is the product of all the individual algorithm matrices).

In addition, DCI security covers not only IMB, but also other electronic components. In the conventional design, different security boundaries on the IMB and projector electronic components are used to meet these requirements. On the contrary, in the design of the all-in-one board according to the present disclosure, the design is realized on the same circuit board with respect to the DCI requirements, so that the security requirements of the IMB and the projector electronic components could be met on the same board, thereby simplifying the design.

It should be pointed out that the design of the all-in-one circuit board as illustrated above is only exemplary; the components on a single circuit board are not so limited, and may have other forms, as long as the function of the electronic device for the DCI compliant DLP projection equipment can be implemented. In particular, the processing circuit (IMB and ICP functions) and output controller (formatter logic) are only divided according to the specific functions they implement, without imposing limits on specific implementation methods. For example, the implementation could be through software, hardware, or the combination of hardware and software. In actual implementation, they can be implemented as independent physical entities, or by a single entity (for example, a processor (CPU or DSP, and the like), an integrated circuit, and the like), or by a combination of physical entities and software algorithms.

According to an embodiment of the present disclosure, a method for constructing a digital cinema-grade Digital Cinema Initiatives (DCI) compliant digital light processing (DLP) projection equipment is also disclosed. The method includes integrating a processing circuit configured to process input video data and an output control circuit configured to control processed video signals so that the video signals are suitable for projection display via the output optics on the same circuit board. According to an embodiment, in this method, both the processing circuit and the output control circuit are designed to comply with the DCI requirements, so that the DLP projection equipment meets the DCI requirements and is DCI compliant. In particular, both the processing circuit and the output control circuit are designed so that the processed video signals directly match and are input to the output control circuit without any intermediate conversion. Here, the processing circuit and the output control circuit can be implemented as described above, and will not be described in detail here. The process for constructing the processing circuit and the output control circuit on the circuit board can adopt circuit manufacturing processes known in the art, which will not be elaborated on here.

According to an embodiment of the present disclosure, an operating method for a digital cinema-grade Digital Cinema Initiative (DCI) compliant digital light processing (DLP) projection equipment is also disclosed. The method comprises processing the input video data by using a processing circuit on a circuit board, and controlling processed video signals by using an output control circuit on the same circuit board so that the video signals are suitable for projection display via an output optics. According to an embodiment, in this method, both the processing circuit and the output control circuit are designed to comply with the DCI requirements, so that the DLP projection equipment meets the DCI requirements and is DCI compliant. In particular, both the processing circuit and the output control circuit are designed so that the processed video signals directly match and are input to the output controller without any intermediate conversion. Therefore, according to the embodiments of the present disclosure, the processing from video data input to display data output is realized on a single circuit board in an all-in-one manner, in particular, the input data can be processed on a single circuit board so as to be directly output to the DMD device for projection display. Here, the processing circuit and the output control circuit can be implemented as described above, and will not be described in detail here.

Figure 4:
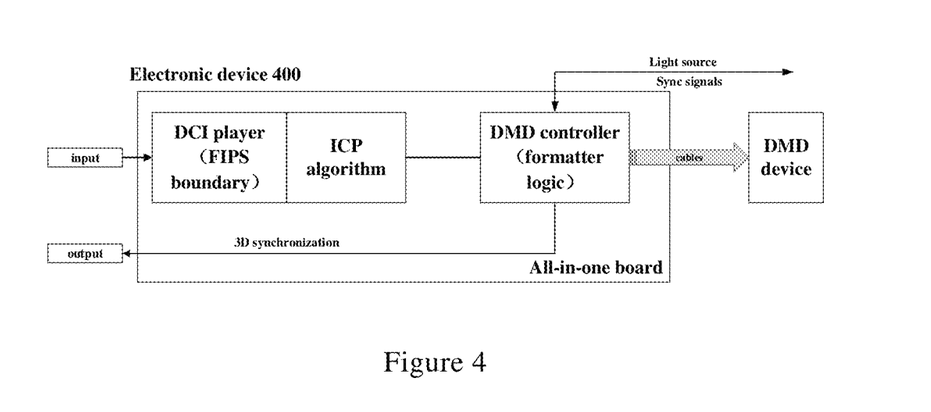
FIG. 4 is a schematic diagram of an exemplary electronic device for a digital cinema-grade DCI compliant DLP projection equipment according to the present disclosure.

FIG. 4 is a block diagram of an exemplary electronic device for an exemplary digital cinema-grade DCI compliant DLP projection equipment, according to an embodiment of the present disclosure. In the electronic device 400, a DCI playback module, an ICP algorithm, and a DMD controller are implemented on a single circuit board, among which the DCI playback module and the ICP algorithm are exemplary implementations of the processing circuit according to the embodiments of the present disclosure, and the DMD controller corresponds to the output controller of the present disclosure.

Among them, the DCI playback module can also implement FIPS security boundaries so as to meet DCI security requirements, such as the FIPS 140-2 certified physical security and/or logical security described above.

The video files input to the DCI playback module are processed, especially processed by the ICP algorithm, and then decomposed into three color signals and output to the DMD controller. The transmitted signals are 12-bit signals, but it should be understood that other signal formats are also applicable, as long as the signals output by the ICP directly match the processing requirements of the DMD controller.

The DMD controller further processes the video signals to generate various color signals which are adapted to Digital Micromirror Device (DMD) so as to complete visual display of digital information. In particular, if the DMD controller needs to display 3D video, for example, the formatter can also apply any 3D multiplication to provide 3D data. In operation, the DMD controller also receives the light source synchronization signal, so that it can process the video signals according to the light source condition.

By implementing the functions of IMB, ICP and formatter logic on a single circuit board (in all-in-one manner), the security and/or quality requirements of DCI standards can be met and the same performance can be implemented with lower cost and higher reliability.

Figure 5:
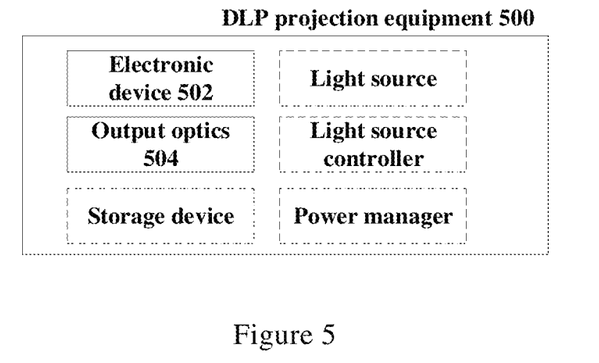
FIG. 5 is a block diagram of a digital cinema-grade DCI compliant DLP projection equipment according to the present disclosure.

FIG. 5 shows a digital cinema-grade DCI compliant DLP projection equipment according to the present disclosure. According to the present disclosure, the DLP projection equipment 500 may be a projection equipment for a DLP theater playback system, in particular a DLP Cinema® projection equipment.

As shown in FIG. 5, in addition to an electronic device 502 corresponding to the electronic device 200 or 300 described above, the DLP projection equipment 500 may also include at least one output optics 504; said at least one output optics implements projection display of video signals from the electronic device. The output optics is, for example, a DMD device.

In addition, the DLP projection equipment 500 may also have a light source and a control circuit to control the light source. As an example, the light source is, for example, a laser diode, a xenon lamp, or any other suitable light source. The DLP projection equipment 500 may further include other control boards for controlling power, light output, etc. in the DLP projection equipment. It should be noted that the DLP projection equipment will also have other components, such as power management components and so on. It should be noted that these light sources, control boards, and the like may also be located outside of the projection equipment and included in the theater system.

According to the present disclosure, a theater system is also provided, comprising the digital cinema-grade DCI compliant DLP projection equipment as described above and other necessary devices for movie playback.

Figure 6:
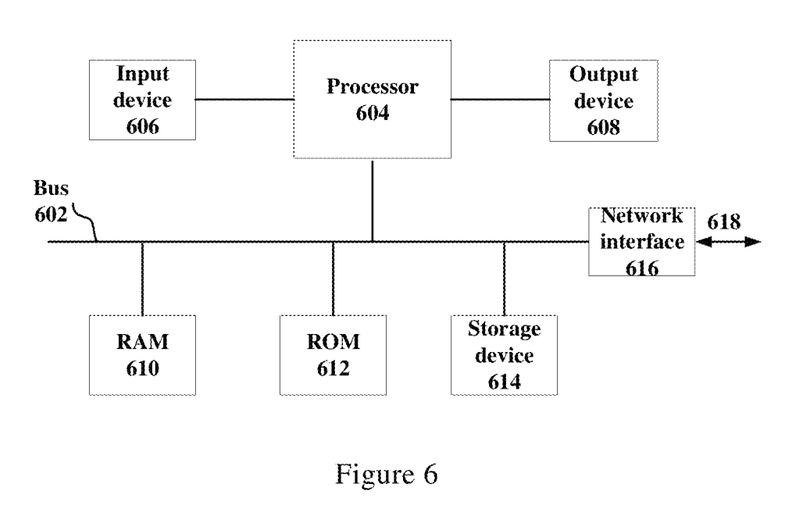
FIG. 6 is an exemplary configuration diagram of a computer device in which an embodiment according to the present disclosure can be implemented.

FIG. 6 illustrates an exemplary configuration of a computing device 600 that can implement an embodiment of the present disclosure. The computing device 600 is an example of an all-in-one circuit board assembly according to the present disclosure. The computing device 600 may be any machine configured to perform processing and/or calculations. The computing device 600 may be, but not limited to, a work station, server, desktop computer, laptop computer, tablet computer, personal data assistant (PDA), smart phone, in-vehicle computer, or a combination thereof.

As shown in FIG. 6, the computing device 600 may include one or more elements that may connect or communicate with the bus 602 via one or more interfaces. The bus 602 may include, but is not limited to, an Industry Standard Architecture (ISA) bus, a Micro Channel Architecture (MCA) bus, an enhanced ISA (EISA) bus, a Video Electronics Standards Association (VESA) local bus, and Peripheral component interconnect (PCI) bus, and the like. The computing device 600 may include, for example, one or more processors 604, one or more input devices 606, and one or more output devices 608. The one or more processors 604 may be any kind of processors, and may include, but not limited to, one or more general-purpose processors or special-purpose processors (such as special-purpose processing chips). The input device 606 may be any type of input device capable of inputting information to a computing device, and may include, but not limited to, a mouse, keyboard, touch screen, microphone, and/or remote controller. The output device 608 may be any type of device capable of presenting information, and may include, but not limited to, a display, a speaker, a video/audio output terminal, a vibrator, and/or a printer.

The computing device 600 may also include or be connected to a non-transitory storage device 614, which may be any non-transitory storage device that can implement data storage, and may include, but not limited to, a disk drive, an optical storage device, a solid-state memory, a floppy disk, a flexible disk, a hard disk, a magnetic tape, or any other magnetic media, compact disks, or any other optical medium, cache memory, and/or any other memory chip or module, and/or any other medium from which a computer can read data, commands and/or of code. The computing device 600 may also include random access memory (RAM) 610 and read-only memory (ROM) 612. The ROM 612 may store programs, applications, or processes to be executed in a non-volatile manner. RAM 610 may provide volatile data storage and store instructions related to the operation of computing device 600. The computing device 600 may also include a network/bus interface 616 coupled to the data link 618. The network/bus interface 616 may be any kind of device or system capable of enabling communication with external devices and/or networks, and may include, but not limited to, a modem, a network card, an infrared communication device, a wireless communication device, and/or a chipset (such as a Bluetooth™ device, a 1302.11 devices, a WiFi device, a WiMax device, a cellular communication facility, and the like).

It should be further understood that the elements of computing device 600 may be distributed throughout the network. For example, one processor may be used to perform some processes while other remote processors may be used to perform other processes. Other elements of computing device 600 may be similarly distributed. Therefore, the computing device 600 may be understood as a distributed computing system that performs processes at multiple locations.

The various aspects, embodiments, specific implementations or features of the foregoing embodiments can be used individually or in any combination. The various aspects of the foregoing embodiments may be implemented by software, hardware, or a combination of hardware and software.

For example, the aforementioned embodiments may be embodied as computer-readable codes on a computer-readable medium. The computer-readable medium is any data storage device that can store data, which can thereafter be read by a computer system. Examples of computer-readable media include read-only memory, random access memory, CD-ROM, DVD, magnetic tape, hard disk drives, solid-state drives, and optical data storage devices. The computer-readable medium can also be distributed among network-coupled computer systems so that the computer-readable code is stored and executed in a distributed fashion.

For example, the aforementioned embodiment may take the form of a hardware circuit. Hardware circuits may include combined logic circuits, clock storage devices (such as floppy disks, flip-flops, latches, and the like), finite state machines, memories such as static random access memory or embedded dynamic random access memory, custom-designed circuits, Any combination of programmable logic arrays, and the like.

Although some specific embodiments of the present disclosure have been presented in detail by way of example, it should be understood by the skilled in the art that the above examples are intended to be illustrative only, not limiting the scope of the present disclosure. The above effects are merely illustrative effects, and the solution of the present disclosure may also have other technical effects. It should be appreciated that some steps of the foregoing method are not necessarily performed in the order illustrated; instead they may be performed simultaneously, in a different order, or in an overlapping manner. In addition, those skilled in the art may add some steps or omit some steps as needed. Some units in the foregoing device do not have to be arranged as shown in the figure, and those skilled in the art may add some units or omit some units as needed. Those skilled in the art should understand that the foregoing embodiments can be modified without departing from the scope and essence of the present disclosure. The scope of the present disclosure is defined by the appended claims.

The invention claimed is:

1. An electronic device for digital cinema-grade Digital Cinema Initiatives (DCI) compliant digital light processing (DLP) projection equipment, including:
a processing circuit configured to:
receive an input signal corresponding to video data,
securely decrypt the video data, and
process the decrypted video data to produce a video signal; and
an output controller configured to: receive the video signal and format the video signal to produce one or more output signals, the one or more output signals suitable for projection via an output optics, wherein, the processing circuit and the output controller are integrated on the same circuit board.

2. The electronic device of claim 1, wherein the electronic device operates so that the DLP projection equipment meets DCI security requirements and wherein the electronic device is DCI compliant.

3. The electronic device of claim 2, wherein the DCI security requirements include FIPS 140-2 certified physical security requirements, logical security requirements, or a combination thereof.

4. The electronic device of claim 1, wherein the processing circuit is further configured to: enable the video signal to be directly adapted to and input into the output controller without any intermediate conversion.

5. The electronic device of claim 1, wherein the processing circuit is a Digital Cinema Initiative (DCI) processing circuit, which is configured to process the video data to comply with DCI security requirements.

6. The electronic device of claim 5, wherein the DCI processing circuit is further configured to process the video data so that the processed video signal meet DCI quality requirements.

7. The electronic device of claim 5, wherein the DCI processing circuit is further configured to perform at least one of: processing the video data for playback for the projection equipment and processing the video data on a time window basis.

8. The electronic device of claim 1, wherein the output controller is further configured to adjust the one or more output signals to be directly adapted to the requirements of the output optics.

9. The electronic device of claim 1, wherein the output optics is at least one digital micromirror device (DMD) device, and the output controller is DMD format controller.

10. The electronic device according to claim 1, wherein the DLP projection equipment is a projection equipment for a DLP theater playback system.

11. A digital cinema-grade Digital Cinema Initiatives (DCI) compatible digital light processing (DLP) projection equipment, including:

an electronic device according to claim 1, and at least one output optics, the at least one output optics configured to project and display the output signals from the electronic device.

12. The DLP projection equipment of claim 11, further comprising:

a light source; and a control circuit for controlling the light source.

13. The electronic device according to claim 1, wherein the video signal comprises one or more portions, each portion of the video signal associated with a color.

14. The electronic device according to claim 1, wherein the output controller is configured to receive a light source synchronization signal, the light source synchronization signal indicative of a light source condition, and wherein the one or more output signals is based on the light source synchronization signal.

15. The electronic device according to claim 1, wherein the one or more output signals is based on at least one of a number of the output optics and an output optics type.

16. The electronic device according to claim 1, wherein the processing circuit comprises:

a DCI player, the DCI player configured to securely decrypt the video data by applying one or more security requirements to the input signal to produce a DCI compliant signal; and an integrated cinema processor (ICP) configured to process the decrypted video data to produce a video signal by performing image processing on the DCI compliant signal to produce the video signal.

17. The electronic device according to claim 16, wherein the ICP receives and processes the DCI compliant signal from the DCI player without an intermediate signal conversion.

* * * * *